(12) United States Patent
Shichino

(10) Patent No.: US 11,909,227 B2
(45) Date of Patent: Feb. 20, 2024

(54) POWER TRANSMITTING APPARATUS, POWER RECEIVING APPARATUS, CONTROL METHOD THEREFOR, AND STORAGE MEDIUM

(71) Applicant: CANON KABUSHIKI KAISHA, Tokyo (JP)

(72) Inventor: Takahiro Shichino, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 23 days.

(21) Appl. No.: 17/835,832

(22) Filed: Jun. 8, 2022

(65) Prior Publication Data

US 2022/0302768 A1    Sep. 22, 2022

Related U.S. Application Data

(63) Continuation of application No. PCT/JP2020/041317, filed on Nov. 5, 2020.

(30) Foreign Application Priority Data

Dec. 10, 2019   (JP) ................................ 2019-223005

(51) Int. Cl.
  *H02J 50/60* (2016.01)
  *H02J 50/80* (2016.01)
  *H02J 50/12* (2016.01)
(52) U.S. Cl.
  CPC .............. *H02J 50/60* (2016.02); *H02J 50/12* (2016.02); *H02J 50/80* (2016.02)

(58) Field of Classification Search
  CPC . H02J 50/10; H02J 50/60; H02J 50/80; H04B 5/0031; H04B 5/0037; H04B 5/0075
  See application file for complete search history.

(56) References Cited

U.S. PATENT DOCUMENTS

| | | | |
|---|---|---|---|
| 9,554,411 B1 | 1/2017 | Hall et al. | |
| 9,887,584 B1 | 2/2018 | Bell et al. | |
| 2013/0094598 A1 | 4/2013 | Bastami | |
| 2016/0134129 A1* | 5/2016 | Watanabe | H02J 50/60 307/104 |

(Continued)

FOREIGN PATENT DOCUMENTS

| | | |
|---|---|---|
| JP | 2015536633 A | 12/2015 |
| JP | 2016531538 A | 10/2016 |

(Continued)

*Primary Examiner* — Patrick O Neill
(74) *Attorney, Agent, or Firm* — Canon U.S.A., Inc. IP Division

(57) ABSTRACT

A power transmitting apparatus sets, on the basis of transmission power set with the power receiving apparatus, a first threshold for determining whether or not a foreign object exist, and a second threshold lower than the first threshold. The first and second threshold are set so that the difference between the first and second threshold values becomes larger as the set transmission power becomes larger. The power transmitting apparatus determines: that a foreign object exists in a case where the power loss is greater than the first threshold; that a foreign object does not exist in a case where the power loss is less than the second threshold; and that there is a possibility of a foreign object existing in a case where the power loss is between the first threshold and the second threshold.

19 Claims, 8 Drawing Sheets

(56) References Cited

U.S. PATENT DOCUMENTS

| | | | |
|---|---|---|---|
| 2019/0296590 A1 | 9/2019 | Chae | |
| 2021/0175756 A1* | 6/2021 | Tachiwa | H02J 50/80 |
| 2021/0203193 A1* | 7/2021 | Kim | H02J 50/80 |

FOREIGN PATENT DOCUMENTS

| | | | |
|---|---|---|---|
| JP | 2017070074 A | 4/2017 | |
| JP | 2017511109 A | 4/2017 | |
| WO | 2015007696 A1 | 1/2015 | |
| WO | 2015018868 A1 | 2/2015 | |
| WO | 2015144389 A1 | 10/2015 | |

* cited by examiner

POWER TRANSMITTING APPARATUS, POWER RECEIVING APPARATUS, CONTROL METHOD THEREFOR, AND STORAGE MEDIUM

CROSS-REFERENCE TO RELATED APPLICATIONS

This application is a Continuation of International Patent Application No. PCT/JP2020/041317, filed Nov. 5, 2020, which claims the benefit of Japanese Patent Application No. 2019-223005, filed Dec. 10, 2019, both of which are hereby incorporated by reference herein in their entirety.

BACKGROUND

Field

The present disclosure relates to a power transmitting apparatus that performs wireless power transmission, a power receiving apparatus, a control method therefor, and a storage medium.

Background Art

A power transmitting apparatus and a power receiving apparatus compliant with a standard (WPC standard) developed by the Wireless Power Consortium (WPC), a group for promoting wireless charging standards, are known. In the method for detecting foreign objects by a power transmitting apparatus according to PTL 1, in a case where a difference (power loss) between the transmission power and the received power is greater than a threshold, it is determined that a foreign object exists in the power-transmittal range of the power transmitting apparatus.

However, using power loss to detect foreign objects brings with it the possibility of the false detection of foreign objects. False detection means determining that a foreign object exists despite no foreign object existing and determining that a foreign object does not exist despite a foreign object existing. However, no mention is given of a method for preventing or reducing the possibility of the false detection of foreign objects.

CITATION LIST

Patent Literature

[PTL 1] Japanese Patent Laid-Open No. 2017-070074

SUMMARY

The present disclosure provides technology for reducing the occurrence of false detection when detecting foreign objects in the power-transmittal range.

According to one aspect of the present disclosure, there is provided a power transmitting apparatus that wirelessly transmits power to a power receiving apparatus, comprising: an obtaining unit configured to obtain a power loss on the basis of transmission power transmitted by the power transmitting apparatus and received power received by the power receiving apparatus; a setting unit configured to, on the basis of transmission power set with the power receiving apparatus, set a first threshold for determining whether or not a foreign object exist, setting a second threshold lower than the first threshold, and set the first threshold and the second threshold so that a difference, between the first threshold and the second threshold, in a case where transmission power is set to a second power greater than a first power is greater than a difference, between the first threshold and the second threshold, in a case where transmission power is set to the first power; and a determining unit configured to determine that a foreign object exists in a case where the power loss is greater than the first threshold, that a foreign object does not exist in a case where the power loss is less than the second threshold, and that there is a possibility of a foreign object existing in a case where the power loss is between the first threshold and the second threshold.

According to another aspect of the present disclosure, there is provided a power receiving apparatus that wirelessly receives power from a power transmitting apparatus, comprising: a receiving unit configured to receive, from the power transmitting apparatus, a notification representing at least one of three determination results including that a foreign object exists, that a foreign object does not exist, and that there is a possibility of a foreign object existing; and a controlling unit configured to control to request the power transmitting apparatus to stop power transmission in a case where a determination result based on a notification received by the receiving unit represents that a foreign object exists, to continue receiving power from the power transmitting apparatus in a case where the determination result represents that a foreign object does not exist, and to limit power transmission by the power transmitting apparatus in a case where the determination result represents that there is a possibility of a foreign object existing.

According to another aspect of the present disclosure, there is provided a control method of a power transmitting apparatus that wirelessly transmits power to a power receiving apparatus, comprising: obtaining a power loss on the basis of transmission power transmitted by the power transmitting apparatus and received power received by the power receiving apparatus; on the basis of transmission power set with the power receiving apparatus, setting a first threshold for determining whether or not a foreign object exist, setting a second threshold lower than the first threshold, and setting the first threshold and the second threshold so that a difference, between the first threshold and the second threshold, in a case where transmission power is set to a second power greater than a first power is greater than a difference, between the first threshold and the second threshold, in a case where transmission power is set to the first power; and determining that a foreign object exists in a case where the power loss is greater than the first threshold, that a foreign object does not exist in a case where the power loss is less than the second threshold, and that there is a possibility of a foreign object existing in a case where the power loss is between the first threshold and the second threshold.

According to another aspect of the present disclosure, there is provided a control method of a power receiving apparatus that wirelessly receives power from a power transmitting apparatus, comprising: receiving, from the power transmitting apparatus, a notification representing at least one of three determination results including that a foreign object exists, that a foreign object does not exist, and that there is a possibility of a foreign object existing; and controlling to request the power transmitting apparatus to stop power transmission in a case where a determination result based on a notification received in the receiving represents that a foreign object exists, to continue receiving power from the power transmitting apparatus in a case where the determination result represents that a foreign object does not exist, and to limit power transmission by the power transmitting apparatus in a case where the determination result represents that there is a possibility of a foreign object existing.

According to another aspect of the present disclosure, there is provided a non-transitory computer readable storage medium storing a program for causing a computer to execute a control method of a power transmitting apparatus that wirelessly transmits power to a power receiving apparatus, comprising: obtaining a power loss on the basis of transmission power transmitted by the power transmitting apparatus and received power received by the power receiving apparatus; on the basis of transmission power set with the power receiving apparatus, setting a first threshold for determining whether or not a foreign object exist, setting a second threshold lower than the first threshold, and setting the first threshold and the second threshold so that a difference, between the first threshold and the second threshold, in a case where transmission power is set to a second power greater than a first power is greater than a difference, between the first threshold and the second threshold, in a case where transmission power is set to the first power; and determining that a foreign object exists in a case where the power loss is greater than the first threshold, that a foreign object does not exist in a case where the power loss is less than the second threshold, and that there is a possibility of a foreign object existing in a case where the power loss is between the first threshold and the second threshold.

According to another aspect of the present disclosure, there is provided a non-transitory computer readable storage medium storing a program for causing a computer to execute a control method of a power receiving apparatus that wirelessly receives power from a power transmitting apparatus, comprising: receiving, from the power transmitting apparatus, a notification representing at least one of three determination results including a foreign object exists, a foreign object does not exist, and there is a possibility of a foreign object existing; and controlling to request the power transmitting apparatus to stop power transmission in a case where a determination result based on a notification received in the receiving represents that a foreign object exists, to continue receiving power from the power transmitting apparatus in a case where the determination result represents that a foreign object does not exist, and to limit power transmission by the power transmitting apparatus in a case where the determination result represents that there is a possibility of a foreign object existing.

Further features of the present disclosure will become apparent from the following description of exemplary embodiments with reference to the attached drawings.

DESCRIPTION OF THE EMBODIMENTS

Figure 1:
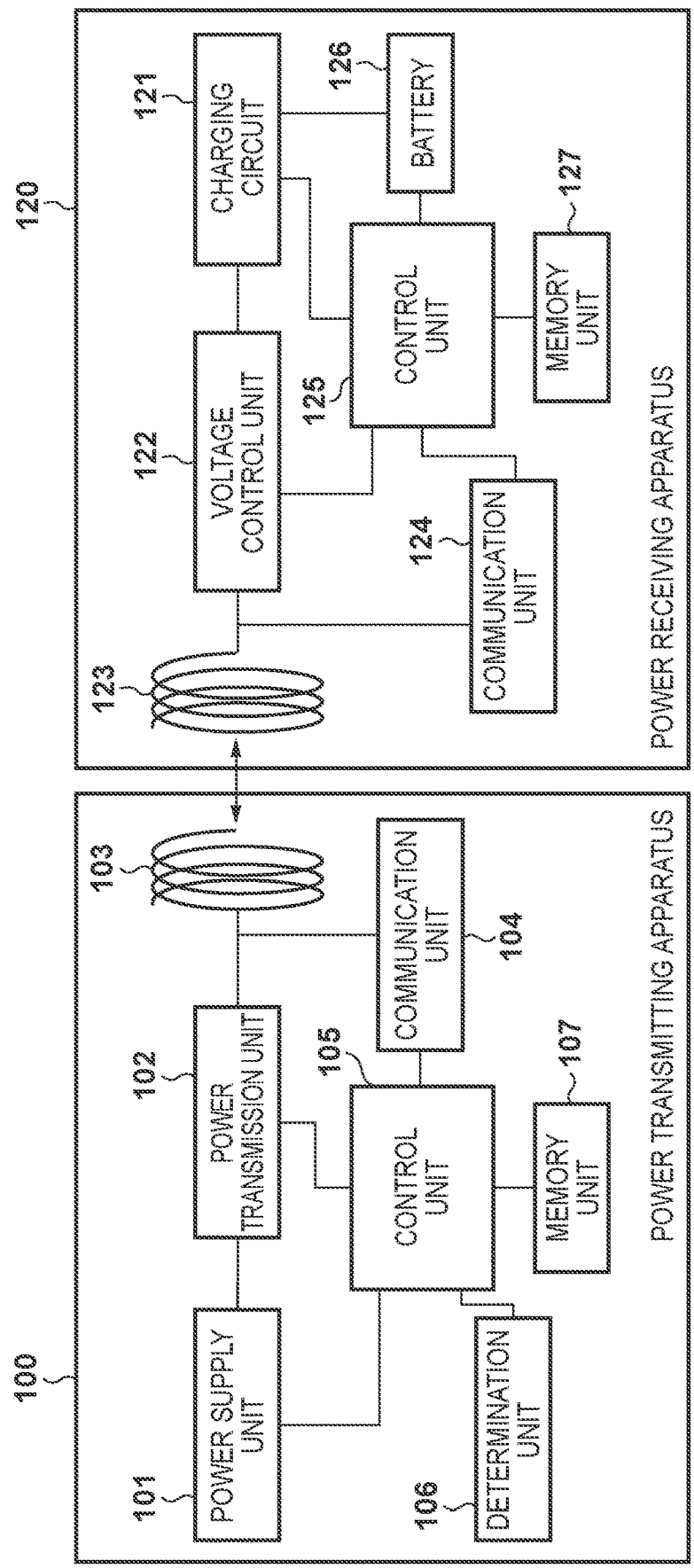
FIG. 1 is a diagram illustrating an example configuration of a power transmitting apparatus and a power receiving apparatus.

Hereinafter, embodiments will be described in detail with reference to the attached drawings. Note, the following embodiments are not intended to limit the scope of the present disclosure. Multiple features are described in the embodiments, but limitation is not made to the present disclosure that requires all such features, and multiple such features may be combined as appropriate. Furthermore, in the attached drawings, the same reference numerals are given to the same or similar configurations, and redundant description thereof is omitted.

Description of Configuration of Power Transmitting Apparatus and Power Receiving Apparatus The configuration of a power transmitting apparatus and a power receiving apparatus will now be described using FIG. 1. FIG. 1 is a block diagram illustrating an example configuration of a power transmitting apparatus 100 and a power receiving apparatus 120 according to an embodiment. The power transmitting apparatus 100 transmits wireless power to the power receiving apparatus 120. A power transmission unit 102 converts the DC voltage and the DC current supplied by a power supply unit 101 into AC voltage and AC current and outputs this to a power transmitting coil 103. The power transmission unit 102 is constituted by a switch circuit. A communication unit 104 superimposes data on the DC voltage and the DC current output by the power transmission unit 102 and performs data communication with the power receiving apparatus 120. A control unit 105 includes one or more processors and controls the entire power transmitting apparatus 100 by executing a program stored in a memory unit 107. A determination unit 106 performs various types of determination relating to foreign object detection. Note that the determination unit 106 may be implemented by the control unit 105 executing a predetermined program or may be executed by a dedicated piece of hardware. The power transmitting apparatus 100 may be a camera, a smart phone, a tablet PC, a laptop PC, a vehicle, a robot, a medical device, a printer, or may be a built-in component thereof.

The power receiving apparatus 120 receives wireless power from the power transmitting apparatus 100. In the power receiving apparatus 120, a voltage control unit 122 converts the AC voltage and the AC current received by a power receiving coil 123 into DC voltage and DC current and supplies this to a charging circuit 121, a communication unit 124, a control unit 125, and the like. The charging circuit 121 charges a battery 126. The communication unit 124 obtains information transmitted from the power transmitting apparatus 100, by demodulating electromagnetic waves input from the power receiving coil 123, and performs data communication with the power transmitting apparatus 100 by superimposing information on electromagnetic waves, by performing load modulation on the electromagnetic waves. The control unit 125 includes one or more processors and controls the entire power receiving apparatus 120 by executing a program stored in a memory unit 127.

Note that a part or all of the processing executed by the control unit 125 may be implemented using dedicated hardware.

The power transmitting apparatus 100 and the power receiving apparatus 120 perform communication using a WPC standard for controlling the transmitting and receiving of power as described above, in which a signal is superimposed on the transmission power using the same antenna (coil) used for the wireless power transmission. Also, the power transmitting apparatus 100 and the power receiving apparatus 120 may perform communication for power transmission and reception control using a different antenna (coil) to that used for wireless power transmission. An example of communication using a different antenna (coil) to that used for wireless power transmission is a communication system compliant with the Bluetooth Low Energy (registered trademark) standard. Other examples of communication using a different antenna to that used for wireless power transmission include IEEE 802.11 standard series wireless LAN (for example, Wi-Fi (registered trademark)) and ZigBee (registered trademark). Furthermore, communication using a different antenna (coil) to that used for wireless power transmission may be performed using another communication system, such as Near Field Communication (NFC), Radio Frequency Identifier (RFID), and the like. Communication using a different antenna (coil) to that used for wireless power transmission may be performed on a different frequency to that used for wireless power transmission.

Description of Foreign Object Detection based on Power Loss

Figure 2A:
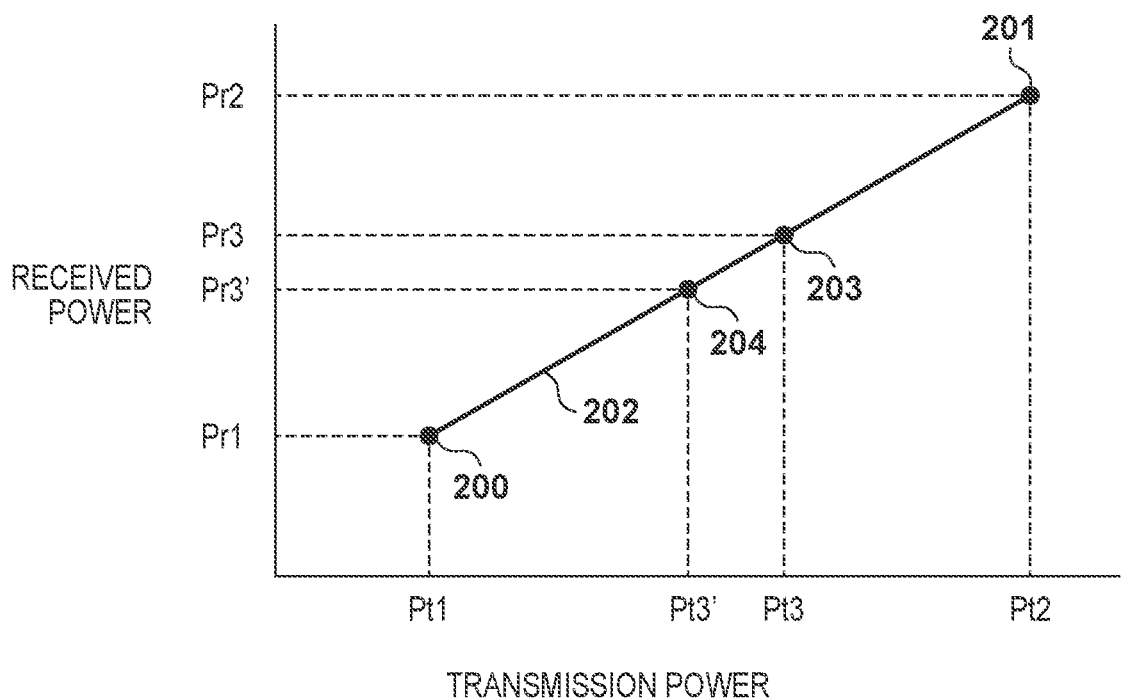
FIG. 2A is a conceptual diagram of foreign object detection based on power loss.

A method for foreign object detection based on power loss will now be described using FIG. 2A. In FIG. 2A, the transmission power of the power transmitting apparatus 100 is represented on the horizontal axis, and the received power of the power receiving apparatus 120 is represented on the vertical axis.

The power transmitting apparatus 100 receives, from the power receiving apparatus 120, a received power value Pr1 (referred to as a light load) when the power received by the power receiving apparatus 120 is not supplied to a load (for example, the charging circuit 121 or the battery 126). Then, the power transmitting apparatus 100 stores a transmission power value Pt1 of that time (point 200). Also, the power transmitting apparatus 100 receives, from the power receiving apparatus 120, a received power value Pr2 (referred to as a connected load) when the power received by the power receiving apparatus 120 is supplied to a load. Then, the power transmitting apparatus 100 stores a transmission power value Pt2 of that time (point 201).

The power transmitting apparatus 100 performs linear interpolation and generates a straight line 202 between the point 200 and the point 201. The straight line 202 indicates the relationship between the transmission power and the received power when no foreign object exists near the power transmitting apparatus 100 and the power receiving apparatus 120. The power transmitting apparatus 100 is capable of estimating the received power of the power receiving apparatus 120 when no foreign object exists from the transmission power value and the straight line 202.

An example of foreign object detection by the power transmitting apparatus 100 includes a method of detecting foreign objects on the basis of an estimated value of the received power when no foreign object exists.

Specifically, in a case where the transmission power value is Pt3, a point 203 on the straight line 202 indicating a transmission power value of Pt3 can be obtained, and the received power value when no foreign object exists can be estimated to be Pr3. Here, in this example, the power transmitting apparatus 100 receives a value corresponding to a received power value Pr3' from the power receiving apparatus 120. The power transmitting apparatus 100 calculates a value Pr3−Pr3' (referred to as the power loss) by subtracting the received power value Pr3' actual received from the power receiving apparatus 120 from the estimated received power value Pr3 relating to when no foreign object exists. The power loss is estimated to be the power consumed by the foreign object. Thus, in a case where the calculated power loss is greater than a predetermined threshold, it can be determined that a foreign object exists.

Another example of foreign object detection by the power transmitting apparatus 100 includes a method of detecting foreign objects on the basis of an estimated value of the transmission power when no foreign object exists. Specifically, in a case where the power transmitting apparatus 100 receives a value corresponding to the received power value Pr3' from the power receiving apparatus 120, the transmission power value when no foreign object exists can be estimated to be Pt3' from point 204 on the straight line 202. Here, in a case where the actual transmission power of the power transmitting apparatus 100 was Pt3, the power transmitting apparatus 100 calculates a value Pt3−Pt3' (power loss) by subtracting the estimated transmission power value Pt3' relating to when no foreign object exists from the actual transmission power value Pt3. As described above, the power loss is estimated to be the power consumed by the foreign object. Thus, in a case where the calculated power loss is greater than a predetermined threshold, it can be determined that a foreign object exists. This concludes the description of foreign object detection based on power loss.

Description of False Detection

Figure 4A:
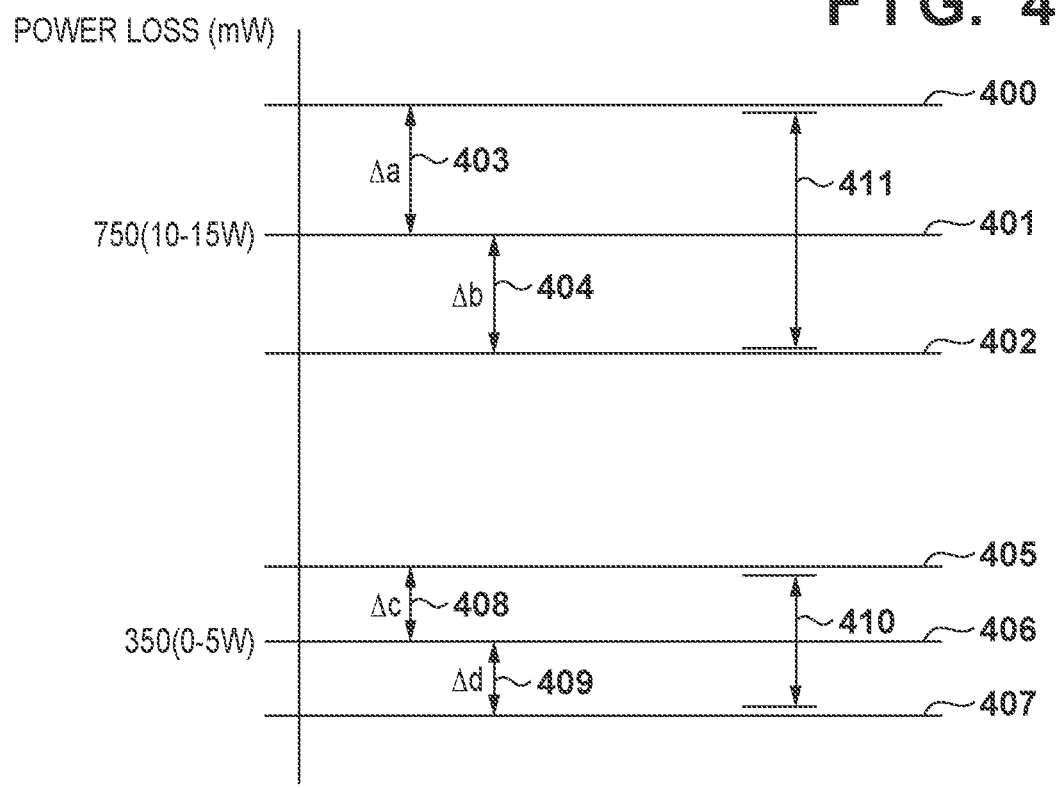
FIG. 4A is a conceptual diagram relating to a threshold set by the power transmitting apparatus.
Figure 4B:
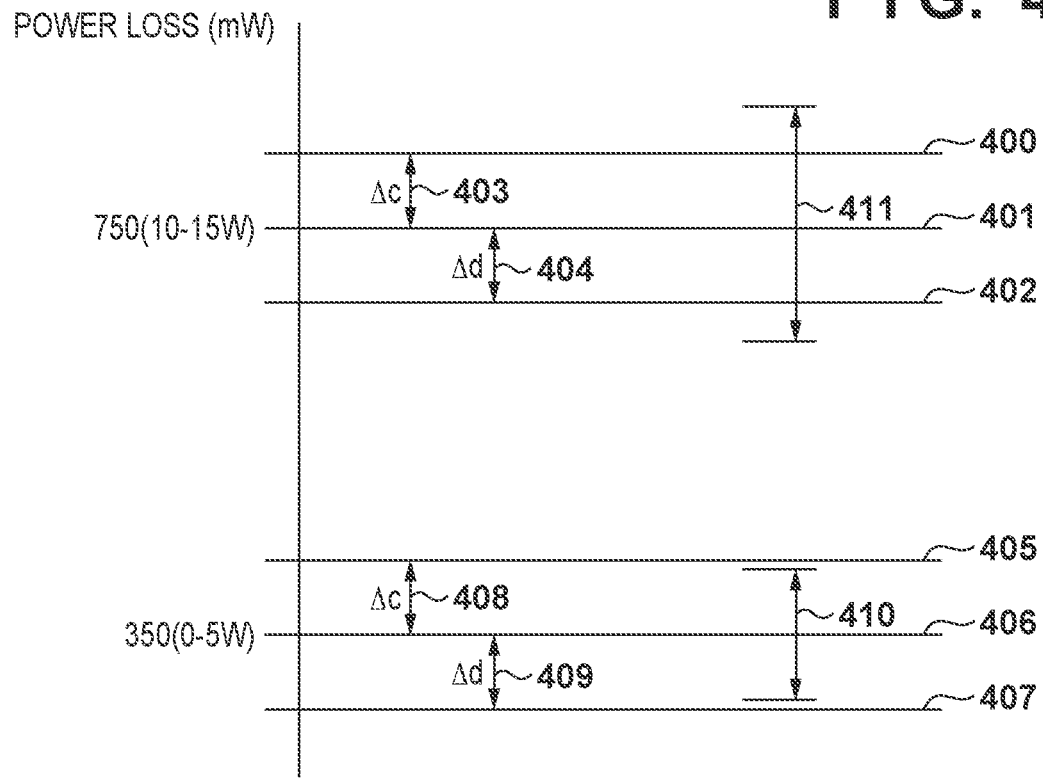
FIG. 4B is a conceptual diagram relating to a threshold set by the power transmitting apparatus.

Next, false detection will be described using FIG. 4B. The vertical axis of FIG. 4B represents the magnitude of the power loss, using milliwatts (mW) as the unit, for determining whether or not a foreign object exists in the method for foreign object detection based on power loss described above. In the WPC standard, the threshold (first threshold) is defined on the basis of the maximum power estimated to be output to a load (for example, the battery 126) by the power receiving apparatus 120. For example, in a case where the maximum power ranges from 0 W to 5 W, the threshold for determining whether or not a foreign object exists is 350 mW (straight line 406). In other words, in a case where the power loss is less than 350 mW (below the straight line 406), the power transmitting apparatus 100 determines that no foreign object exists, and in a case where the power is equal to or greater than 350 mW (above the straight line 406), the power transmitting apparatus 100 determines that a foreign object exists. Also, in a case where the maximum power ranges from 5 W to 10 W, the threshold for determining whether or not a foreign object exists is 500 mW (not-illustrated), and in a case where the maximum power ranges from 10 W to 15 W, the threshold for determining whether or not a foreign object exists is 750 mW (straight line 401).

An arrow 410 and an arrow 411 in FIG. 4B correspond to a width indicating the uncertainty associated with power loss. Uncertainty means an error included in the detection value, such as an error in detecting the voltage and current for the power transmitting apparatus 100 and the power receiving apparatus 120 to calculate the transmission power and the received power, power loss caused by noise superimposed on the voltage and the current, and the like. The arrow 410 and the arrow 411 indicate the range of variation in the power loss calculation result due to a measurement error in the transmission power by the power transmitting apparatus 100 and an error in the detection of the voltage and the current of the received power by the power receiving apparatus 120 caused by noise superimposed on the voltage and the current or the detection timing. Note that the variation is the sum of the error in measurement by the power transmitting apparatus 100 and the error in detection by the power receiving apparatus 120.

First, we will look at a case in which the maximum power ranges from 0 W to 5 W. In a case where, with no uncertainty, the actual power loss is on the threshold (straight line 406) and a foreign object actually exists, the uncertainty (arrow 410) of the power loss is a range above and below the first threshold (straight line 406) with the straight line 406 indicating the actual power loss set as the midpoint. The lower limit of the uncertainty (arrow 410) is less than the first threshold (straight line 406). Thus, even if a foreign object actually exists, it may be determined that a foreign object does not exist if a value less than the first threshold (straight line 406) is detected for the power loss, resulting in a false detection. In the opposite case where, with no uncertainty, the actual power loss is just below the first threshold (straight line 406) and a foreign object actually does not exist, the upper limit of the uncertainty (arrow 410) is greater than the first threshold (straight line 406). Thus, even if a foreign object does not actually exist, it may be determined that a foreign object does exist if a value greater than the first threshold (straight line 406) is detected for the power loss, resulting in a false detection.

In order to prevent such false detections, in addition to determination of a foreign object existing (first determination) and determination of a foreign object not existing (second determination), it is also plausible to perform a determination of there is a possibility of a foreign object existing (third determination). Specifically, a second threshold (straight line 405) greater than the first threshold (straight line 406) by power $\Delta c$ (the length of arrow 408) and a third threshold (straight line 407) less than the first threshold (straight line 406) by a power $\Delta d$ (arrow 409) are defined. Then, in a case where the power loss is greater than the third threshold and less than the second threshold (between the straight line 405 and the straight line 407), the power transmitting apparatus 100 determines that there is a possibility that a foreign object exists. Also, in a case where the power loss is greater than the second threshold (greater than the straight line 405), the power transmitting apparatus 100 determines that a foreign object exists, and in a case where the power loss is less than the third threshold (less than the straight line 407), the power transmitting apparatus 100 determines that a foreign object does not exist. Here, the magnitude of $\Delta c$ and $\Delta d$ are set to equal to or greater than half of the width of the uncertainty (length of the arrow 410), and the magnitude of $\Delta c$ and $\Delta d$ are the same.

In the example described below, the actual power loss, with no uncertainty, is between the first threshold (straight line 406) and the second threshold (straight line 405). The actual power loss is above the first threshold (straight line 406), and thus a foreign object actually exists. In this example, the actual power loss is between the first threshold (straight line 406) and the second threshold (straight line 405), and the magnitude of $\Delta c$ and $\Delta d$ are equal to or greater than half of the uncertainty (arrow 410). Accordingly, the lower limit of the uncertainty (arrow 410) is always greater than the third threshold (straight line 407) and always less than the first threshold (straight line 406). Because the lower limit of the uncertainty is never less than the third threshold in this manner, the power transmitting apparatus 100 prevents false detections in which a foreign object is determined to not exist when a foreign object actually does exist. Here, the upper limit of the uncertainty (arrow 410) may be greater than the second threshold (straight line 405). In this case, the power transmitting apparatus 100 determines that a foreign object exists due to the uncertainty, and this is not problematic because this is a correct detection result.

In the example described below, the actual power loss, with no uncertainty, is between the first threshold (straight line 406) and the third threshold (straight line 407). The actual power loss is below the first threshold (straight line 406), and thus a foreign object does not actually exist. In this example, the actual power loss is between the first threshold (straight line 406) and the third threshold (straight line 407), and the magnitude of $\Delta d$ and $\Delta c$ are equal to or greater than half of the uncertainty (arrow 410). Accordingly, the upper limit of the uncertainty (arrow 410) is always less than the second threshold (straight line 405) and always greater than the first threshold. Because the upper limit of the uncertainty is never greater than the second threshold in this manner, the power transmitting apparatus 100 prevents false detections in which a foreign object is determined to exist when a foreign object actually does not exist. Here, the lower limit of the uncertainty (arrow 410) may be less than the third threshold (straight line 407). In this case, the power transmitting apparatus 100 determines that a foreign object does not exist due to the uncertainty, and this is not problematic because this is a correct detection result.

Issue with Defining the Third Determination

Next, we will look at the issues regarding performing the third determination of there is a possibility of a foreign object existing. As described above, in the WPC standard, the magnitude of the first threshold is set on the basis of the maximum power of the power receiving apparatus. Here, whether in a case where the maximum power of the power receiving apparatus 120 ranges from 0 to 5 W and in a case where the maximum power of the power receiving apparatus 120 ranges from 10 W to 15 W, the difference ($\Delta c$) between the second threshold and the first threshold and the difference ($\Delta d$) between the third threshold and the first threshold are set to be the same. For example, we will look at the example illustrated in FIG. 4B where the second threshold (straight line 400) is greater than the first threshold (straight line 401) by power $\Delta c$ (arrow 403) and the third threshold (straight line 402) is less than the first threshold (straight line 401) by power $\Delta d$ (arrow 404). Here, the size of the arrow 403 and the size of the arrow 408 (=$\Delta c$) are the same, and the size of the arrow 404 and the size of the arrow 409 (=$\Delta d$) are the same.

As the maximum power of the power receiving apparatus 120 increases, so does the error in detecting the voltage and the current for calculating the transmission power of the power transmitting apparatus 100 and the received power of the power receiving apparatus 120, the noise superimposed on the voltage and the current, and the like. The uncertainty in a case where the maximum power of the power receiving apparatus 120 ranges from 10 W to 15 W is indicated by the arrow 411. The arrow 411 is larger in size than the arrow 410 for this reason. In a case where, with no uncertainty, the actual power loss is on the first threshold (straight line 401) and a foreign object actually exists, the uncertainty (arrow 411) of the power loss is a range above and below the first threshold (straight line 401) with the straight line 401 indicating the actual power loss set as the midpoint. Because the arrow 411 is larger in size than the arrow 410, the lower limit of the uncertainty (arrow 411) may be less than the third threshold (straight line 402) and the upper limit may be greater than the second threshold (straight line 400).

First, we will look at an example where the actual power loss, with no uncertainty, is between the first threshold (straight line 401) and the second threshold (straight line 400). The actual power loss is above the first threshold (straight line 401), and thus a foreign object actually exists. In this example, the actual power loss is between the first threshold (straight line 401) and the second threshold (straight line 400), and the magnitude of Δc and Δd are equal to or less than half of the uncertainty (arrow 411) in a case where the maximum power ranges from 10 to 15 W. Accordingly, as illustrated in FIG. 4B, the lower limit of the uncertainty (arrow 411) may be less than the third threshold (straight line 402). This means that, for the power transmitting apparatus 100, there is a possibility that a foreign object is determined to not exist when a foreign object does actually exist, i.e., that there is a possibility of a false detection occurring.

Next, we will look at an example where the actual power loss, with no uncertainty, is between the first threshold (straight line 401) and the third threshold (straight line 402). The actual power loss is below the first threshold (straight line 401), and thus a foreign object does not actually exist. In this example, the actual power loss is between the first threshold (straight line 401) and the third threshold (straight line 402), and the magnitude of Δd and Δc are equal to or less than half of the uncertainty (arrow 411). Accordingly, as illustrated in FIG. 4B, the upper limit of the uncertainty (arrow 411) may be greater than the second threshold (straight line 400). This means that, for the power transmitting apparatus 100, there is a possibility that a foreign object is determined to exist when a foreign object actually does not exist, i.e., that there is a possibility of a false detection occurring.

Configuration for Solving Issue

A configuration for solving the issue described above will now be described using FIG. 4A. The power transmitting apparatus 100 of the present embodiment sets the second threshold and the third threshold on the basis of the maximum power of the power receiving apparatus 120. Specifically, in a case where the maximum power of the power receiving apparatus 120 ranges from 10 W to 15 W, the second threshold (straight line 400) is defined as being greater than the first threshold (straight line 401) by power Δa (arrow 403). Here, the magnitude of Δa is greater than Δc and equal to or greater than the magnitude of half of the uncertainty (arrow 411). In a similar manner, the third threshold (straight line 402) is defined to be a value less than the first threshold (straight line 401) by power Δb (arrow 404). Here, the magnitude of Δb is greater than Δd and equal to or greater than the magnitude of half of the uncertainty (arrow 411).

Next, we will look at an example where the actual power loss, with no uncertainty, is between the first threshold (straight line 401) and the second threshold (straight line 400). In this case, the actual power loss is above the first threshold (straight line 401), and thus a foreign object actually exists. In this example, the actual power loss is between the first threshold (straight line 401) and the second threshold (straight line 400), and the magnitude of Δb is equal to or greater than half of the uncertainty (arrow 411) in a case where the maximum power ranges from 10 to 15 W. Accordingly, as illustrated in FIG. 4A, the lower limit of the uncertainty (arrow 411) is never less than the third threshold (straight line 402). This means that, for the power transmitting apparatus 100, there is no possibility that a foreign object is determined to not exist when a foreign object does actually exist, i.e., that false detection can be prevented.

Next, in a similar manner, we will look at an example where the actual power loss, with no uncertainty, is between the first threshold (straight line 401) and the third threshold (straight line 402). The actual power loss is below the first threshold (straight line 401), and thus a foreign object does not actually exist. Because the magnitude of Δa is equal to or greater than half of the uncertainty (arrow 411), as illustrated in FIG. 4A, the upper limit of the uncertainty (arrow 411) is never greater than the second threshold (straight line 400). This means that, for the power transmitting apparatus 100, there is no possibility that a foreign object is determined to exist when a foreign object actually does not exist, i.e., that false detection can be prevented.

The power transmitting apparatus 100 of the present embodiment described above has a foreign object detection function based on the power loss derived from the transmission power and the received power notified from the power receiving apparatus 120 for setting the first threshold for determining whether or not a foreign object exists. Also, the power transmitting apparatus 100 sets the second threshold with a higher power loss than the first threshold and the third threshold with a lower power loss than the first threshold. The power transmitting apparatus 100 performs the first determination of a foreign object existing in a case where the power loss is greater than the second threshold and performs the second determination of a foreign object not existing in a case where the power loss is less than the third threshold. Furthermore, the power transmitting apparatus 100 performs the third determination of there is a possibility of a foreign object existing in a case where the power loss is between the second threshold and the third threshold. Here, the second threshold and the third threshold are set on the basis of the magnitude of the maximum power (or Guaranteed Power (GP)) of the power receiving apparatus 120. Specifically, in a case of a high maximum power, compared to a case of a low maximum power, the difference between the second threshold and the first threshold and the difference between the third threshold and the second threshold are set to increase. Also, in a case of a low maximum power, compared to a case of a high maximum power, the difference between the second threshold and the first threshold and the difference between the third threshold and the second threshold are set to decrease. With this configuration, the power transmitting apparatus 100 is capable of reducing or preventing the false detection of a foreign object.

Sequence Description

Figure 3:
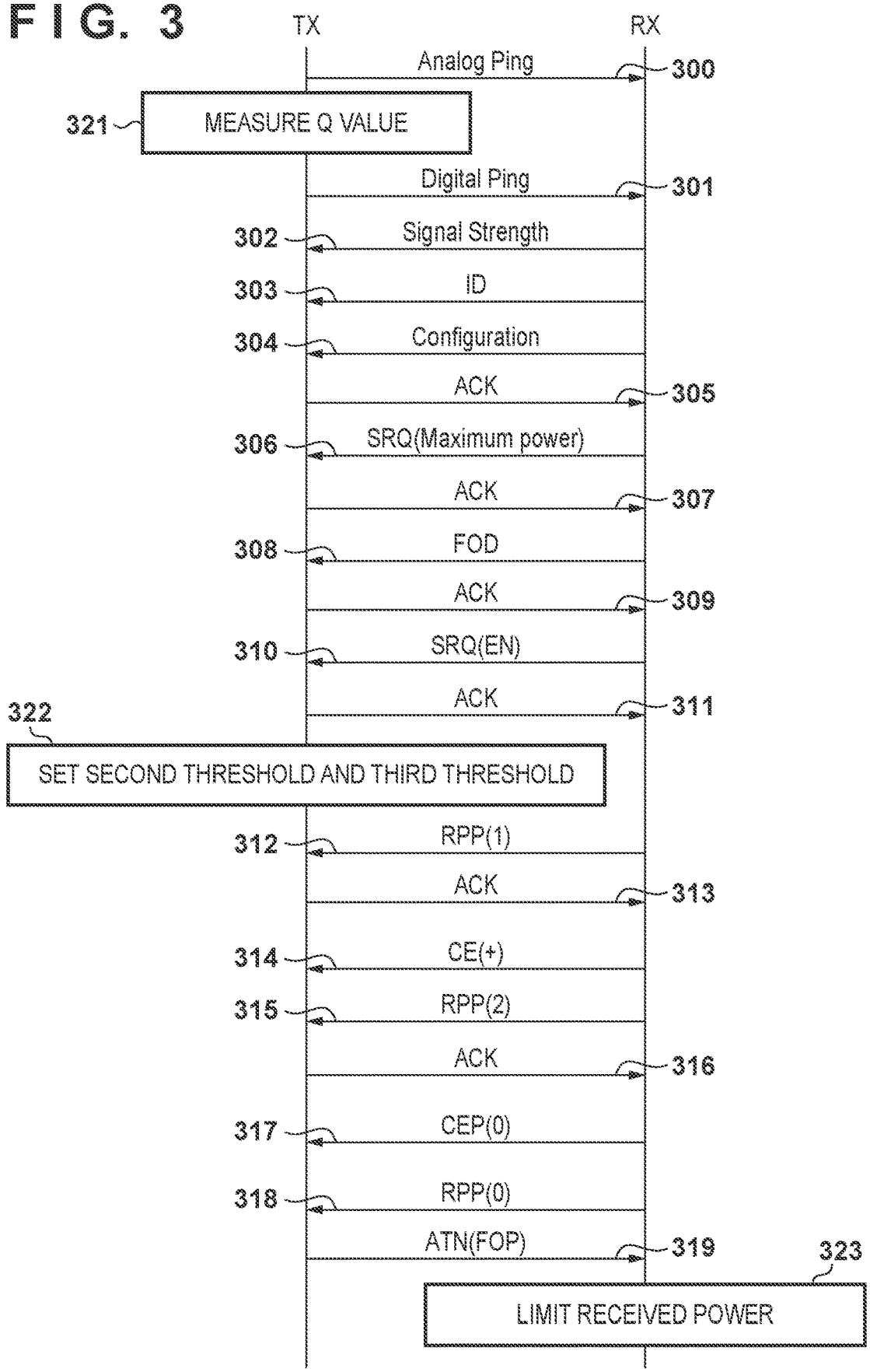
FIG. 3 is a sequence diagram of the power transmitting apparatus and the power receiving apparatus.
Figure 5A:
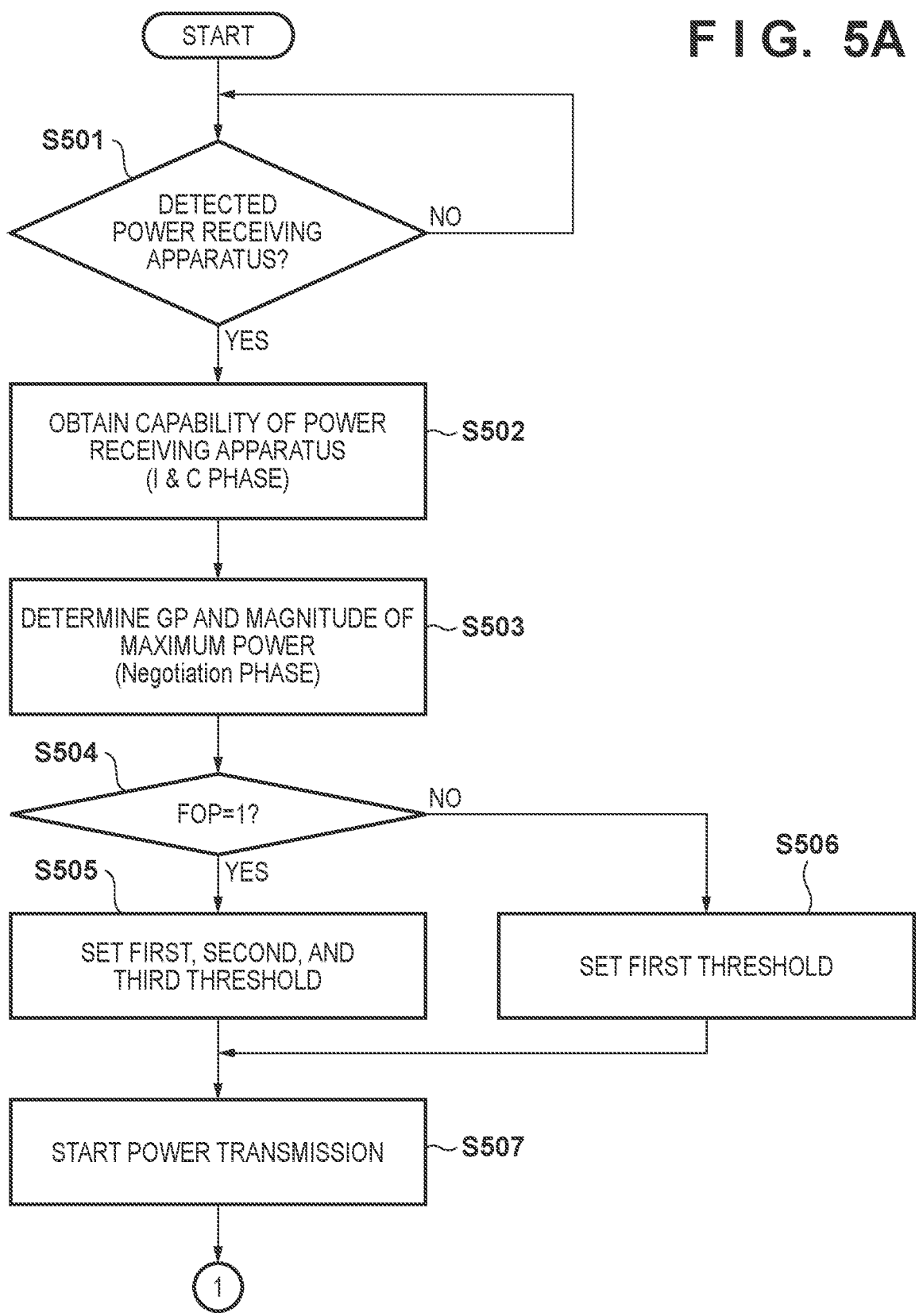
FIG. 5A is a flowchart for describing the operations of the power transmitting apparatus.
Figure 5B:
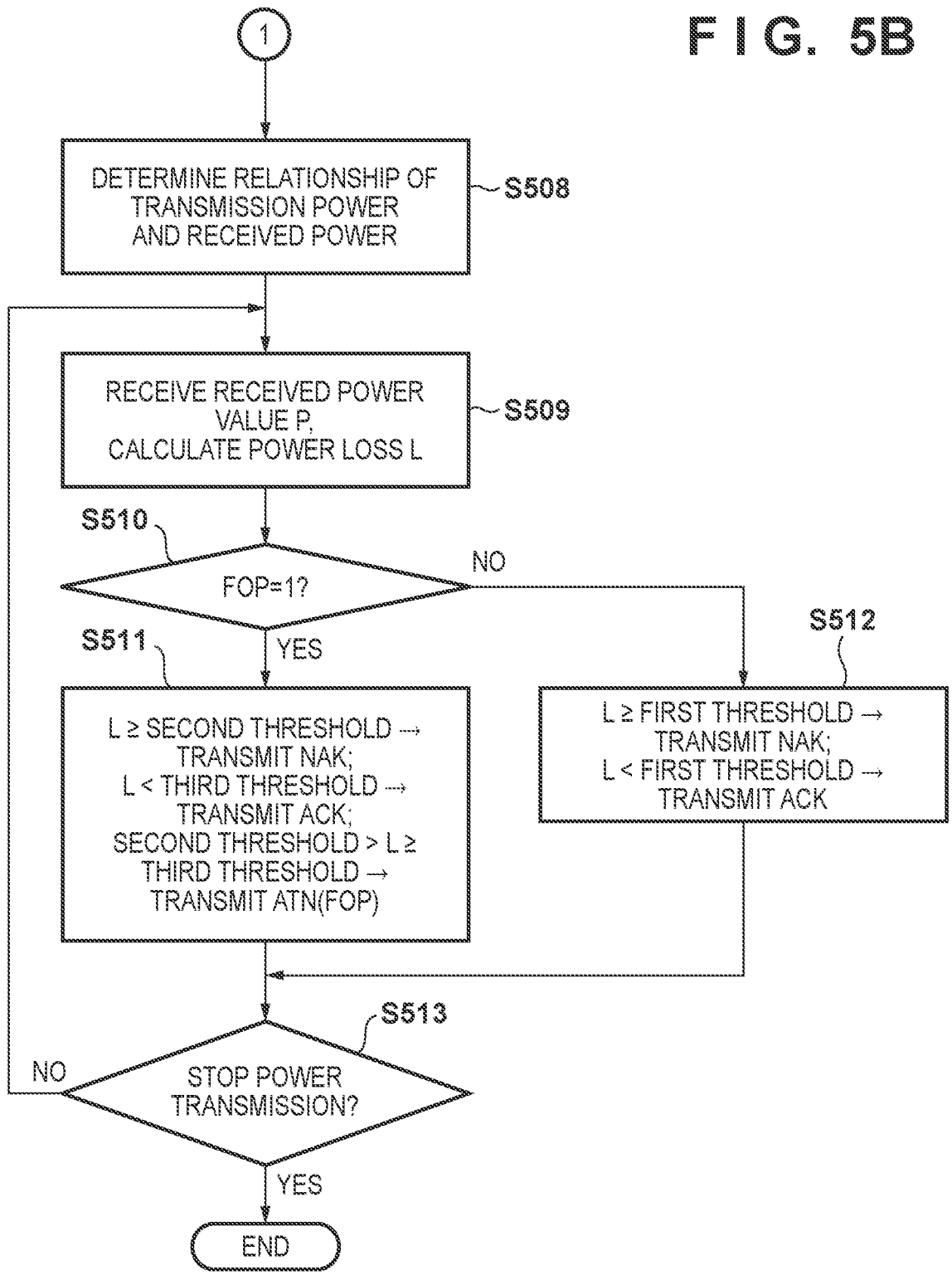
FIG. 5B is a flowchart for describing the operations of the power transmitting apparatus.
Figure 6A:
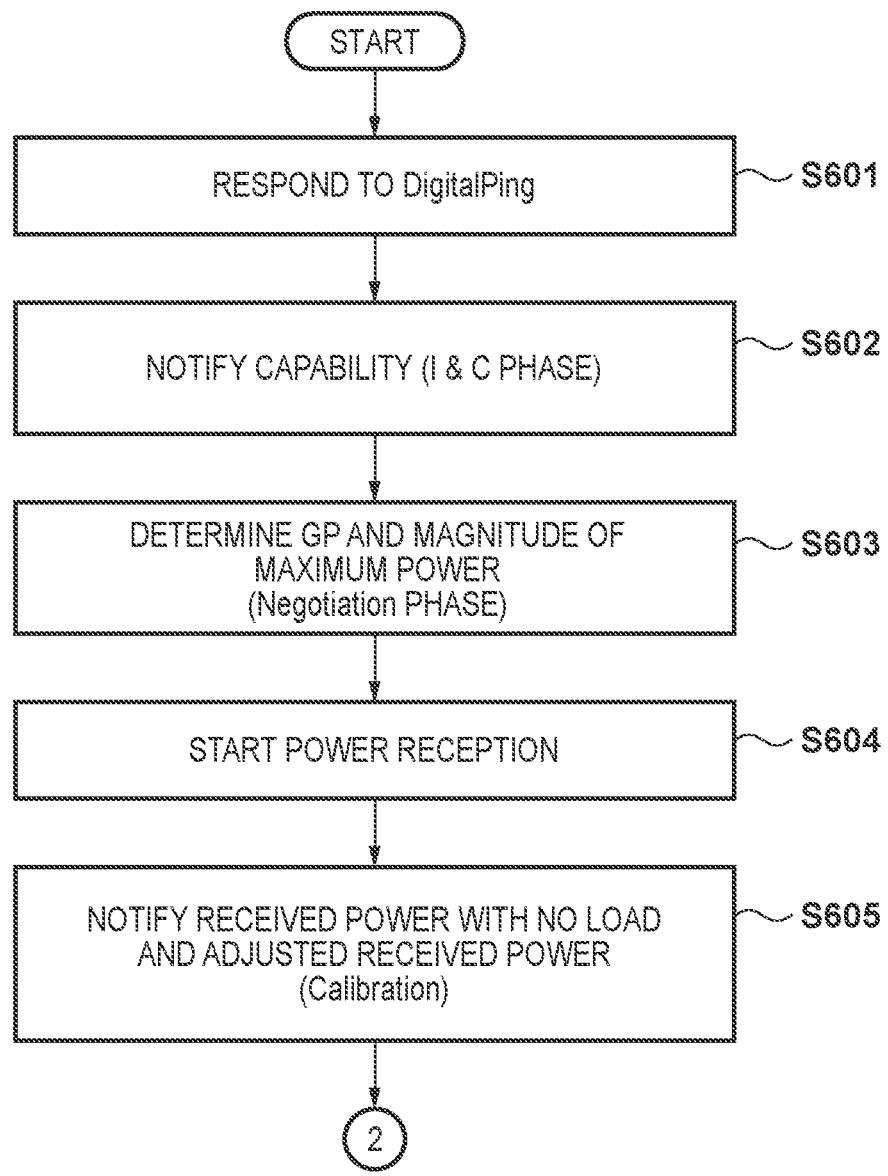
FIG. 6A is a flowchart for describing the operations of the power receiving apparatus.
Figure 6B:
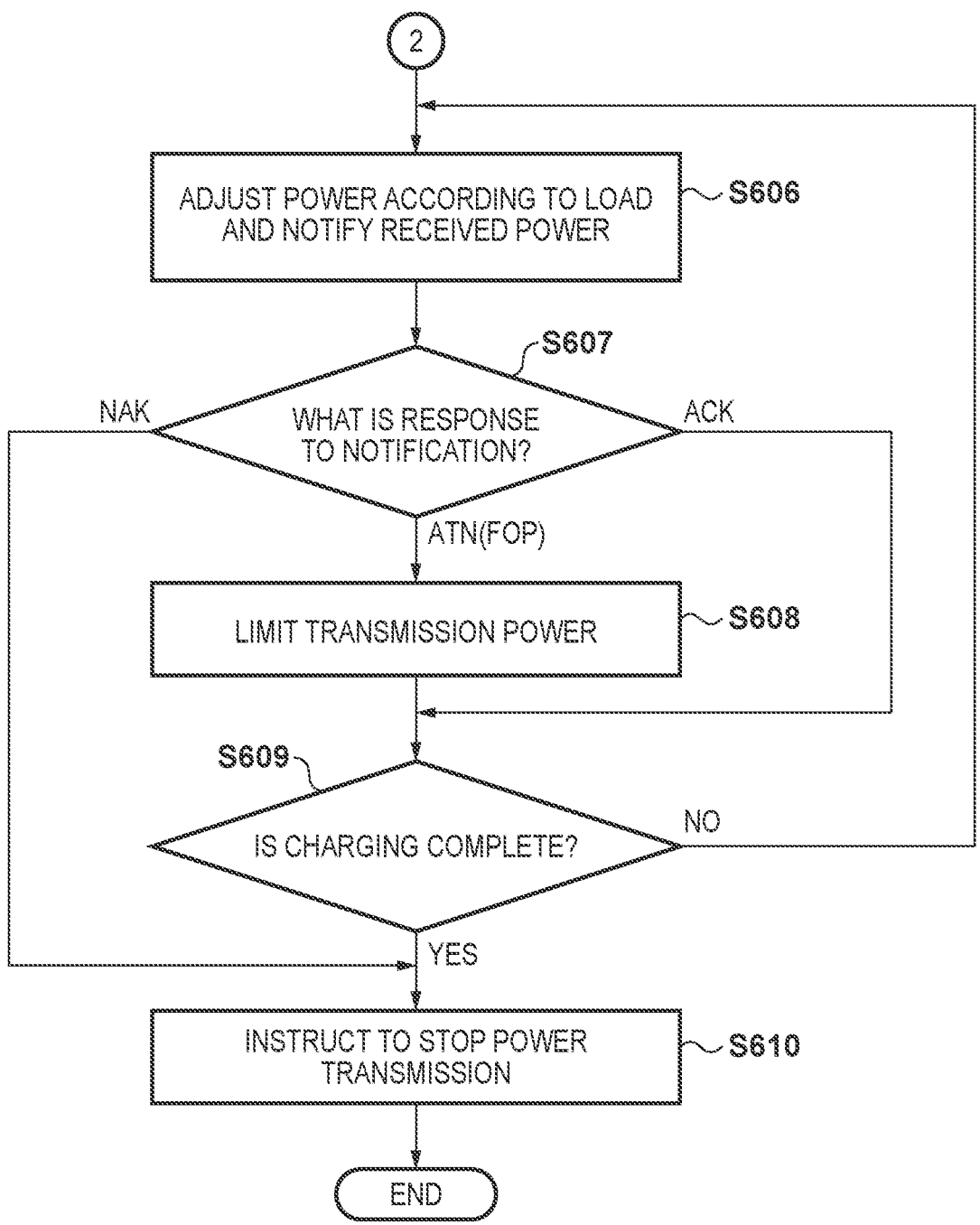
FIG. 6B is a flowchart for describing the operations of the power receiving apparatus.

FIG. 3 is a sequence diagram illustrating an example of the operations of the power transmitting apparatus 100 and the power receiving apparatus 120. Also, FIGS. 5A and 5B are flowcharts illustrating an example of the operations of the power transmitting apparatus 100, and FIGS. 6A and 6B are flowcharts illustrating an example of the operations of the power receiving apparatus 120. The operations of the power transmitting apparatus 100 and the power receiving apparatus 120 according to the present embodiment will now be described with reference to the FIGS. 3, 5A, 5B, 6A, and 6B.

The control unit 105 of the power transmitting apparatus 100 determines whether or not a power receiving apparatus is detected (step S501). In a case where a power receiving apparatus is detected (YES in step S501), the process proceeds to step S502. In the present embodiment, a Digital Ping is used to detect the power receiving apparatus. When the control unit 125 of the power receiving apparatus 120 responses to the Digital Ping of the power transmitting apparatus 100, the process proceeds to step S602.

The process described above will now be described in more detail with reference to FIG. 3. When the power transmitting apparatus 100 is activated, the power transmitting apparatus 100 intermittently transmits an Analog Ping via the power transmitting coil 103 (300). An Analog Ping is a very small power signal for detecting an object existing near the power transmitting coil 103. When the power transmitting apparatus 100 transmit the Analog Ping, the power transmitting apparatus 100 is in a Selection phase state.

The power transmitting apparatus 100 detects fluctuation in the voltage value or the current value of the power transmitting coil 103 or in the resonant frequency. In a case where the detected fluctuation is greater than a certain threshold, the power transmitting apparatus 100 determines that an object exists near the power transmitting coil 103 and performs a Q-factor measurement (321). Q-factor measurement means measuring the Q-factor of the power transmitting coil 103. The measured Q-factor is used in foreign object detection based on the Q-factor described below. After the Q-factor measurement, the power transmitting apparatus 100 transitions to a Ping phase.

In the Ping phase, the power transmitting apparatus 100 transmits a Digital Ping with more power than the Analog Ping (301). The amount of power of the Digital Ping is sufficient enough to at least activate the control unit 125 of the power receiving apparatus 120 located near the power transmitting coil 103. When the control unit 125 of the power receiving apparatus 120 is activated by the power received via the power receiving coil 123, the power transmitting apparatus 100 is notified of a Signal Strength indicating the magnitude of the received voltage (302). After notification, the power receiving apparatus 120 transitions to an Identification and Configuration phase (hereinafter, referred to as I&C phase). When the Signal Strength is received, the power transmitting apparatus 100 transitions to the I&C phase.

In the I&C phase, the power receiving apparatus 120 notifies the power transmitting apparatus 100 of its capability (step S602). Here, the power receiving apparatus 120 of the present embodiment sends a notification indicating that it can understand a state of there is a possibility of a foreign object existing. The power transmitting apparatus 100 obtains the capability of the power receiving apparatus 120 via the notification (step S502).

The process (steps S502 and S602) described above will now be described in more detail using FIGS. 3 (303 to 305). The power receiving apparatus 120 transmits, to the power transmitting apparatus 100, an ID packet (303) including a manufacturer code indicating the manufacturer of the power receiving apparatus 120 or device identification information and a Configuration Packet (304) including the standard version the power receiving apparatus 120 is compliant with and the like. The maximum power of the power receiving apparatus is stored in the Configuration Packet. Also, a FOP, which is information indicating whether or not the determination of the power transmitting apparatus 100 of there is a possibility of a foreign object existing can be understood described above is stored in the Configuration Packet. FOP stands for a foreign object existence possibility bit. A case where the FOP is 1 indicates that a determination of there is a possibility of a foreign object existing can be understood, and otherwise (a case where the FOP is 0) it means that this cannot be understood.

The power transmitting apparatus 100 receives the Configuration Packet transmitted by the power receiving apparatus 120. In a case where the standard version the power receiving apparatus 120 is compatible with is (for example) version 1.2.2 or higher, the power transmitting apparatus 100 transmits, to the power receiving apparatus 120, an ACK indicating that information included in the Configuration Packet has been permitted (305). Then, the power transmitting apparatus 100 transitions to a Negotiation phase. In a similar manner, when the power receiving apparatus 120 receives the ACK (305), the power receiving apparatus 120 transitions to a Negotiation phase.

In the Negotiation phase, the power transmitting apparatus 100 and the power receiving apparatus 120 negotiate in relation to the Guaranteed Power (hereinafter, referred to as GP) indicating the magnitude of the power the power receiving apparatus 120 is definitely able to receive and the maximum power (Maximum power) of the power receiving apparatus 120. Then, the GP and the maximum power are determined between the power transmitting apparatus 100 and the power receiving apparatus 120 (steps S503 and S603). This process will now be described in more detail using FIGS. 3 (306 to 311).

The power receiving apparatus 120 transmits, to the power transmitting apparatus 100, a Specific Request (hereinafter, referred to as SRQ) for requesting the GP and the maximum power. For example, an SRQ packet (SRQ (GP) packet) storing a value for requesting the GP and/or an SRQ packet (SRQ (Maximum power) packet)) storing a value for requesting the maximum power is transmitted to the power transmitting apparatus 100 (306).

The power transmitting apparatus 100 grants or denies the request included in the SRQ (GP) packet and the SRQ (Maximum power) packet. In a case where the requests are granted, the power transmitting apparatus 100 transmits an ACK packet indicating this to the power receiving apparatus 120 (307). When the GP and the maximum power are determined, the power transmitting apparatus 100 stores a Power Transfer Contract describing the contract relating to the power to be transferred to the power receiving apparatus 120.

When the ACK packet (307) is received, the power receiving apparatus 120 transmits, to the power transmitting apparatus 100, information relating to the foreign object detection function based on the Q-factor. Specifically, the Q-factor of the power transmitting coil 103 of the power transmitting apparatus 100 in a case where the power receiving apparatus 120 is placed on the power transmitting apparatus 100 defined by the WPC standard is stored in a FOD (Foreign Object Detection) Status Packet (hereinafter, referred to as FOD) and transmitted to the power transmitting apparatus 100 (308).

When the FOD packet is received, the power transmitting apparatus 100 determines whether or not a foreign object exists in an area that would affect the transmission power on the basis of the Q-factor measured in the Q-factor measurement (321) and a Q_report included in the FOD packet. Here, suppose an ACK indicating that the power transmitting apparatus 100 has determined that a foreign object does not exist is transmitted to the power receiving apparatus (309). When the ACK is received, the power receiving apparatus 120 transmits, to the power transmitting apparatus 100, an End Negotiation Packet (SRQ(EN)) indicating the end of the Negotiation phase in the SRQ (310). In response to the SRQ(EN), the power transmitting apparatus 100 transmits an ACK to the power receiving apparatus 120 (311) and ends the Negotiation phase.

The control unit 105 of the power transmitting apparatus 100 confirms the FOP bit stored in the Configuration Packet received from the power receiving apparatus 120 (step S504). In other words, the control unit 105 confirms whether or not the power receiving apparatus 120 has the capability to receive a determination result that there is a possibility of a foreign object existing. In a case where the FOP bit is 1 (YES in step S504), the power receiving apparatus is confirmed to have the capability, and the control unit 105 sets the first threshold, the second threshold, and the third threshold in the determination unit 106 as described above using FIG. 4A (step S505). In other words, the control unit 105 sets the first threshold for determining whether or not a foreign object exists in the determination unit 106 on the basis of the power (for example, maximum power) of the power transmission set with the power receiving apparatus 120. Also, the control unit 105 sets the second threshold, which is greater than the first threshold, and the third threshold, which is less than the first threshold, in the determination unit 106. Here, as the set transmission power increases, so does the value of the first threshold. Also, as the set transmission power increases, so does the difference between the second threshold and the third threshold (magnitude of uncertainty). For example, in a case where the transmission power set with the power receiving apparatus is a second power greater than a first power, the difference between the second threshold and the third threshold is set to be greater than the difference between the second threshold and the third threshold in a case where the transmission power is the first power. The difference between the second threshold and the third threshold may change in a linear manner according to the set transmission power or may change incrementally. Using the second threshold and the third threshold, in foreign object detection based on power loss, a determination of there is a possibility of a foreign object existing can be performed.

On the other hand, in a case where the FOP bit is 0 (NO in step S504), the control unit 105 sets only the first threshold and not the second threshold and the third threshold (step S506). Accordingly, in a case where it cannot be confirmed that the power receiving apparatus 120 has the capability to receive a determination result of there is a possibility of a foreign object existing, the determination of there is a possibility of a foreign object existing is not performed. Here, the FOP bit is 1, and the power transmitting apparatus 100 sets the second threshold and the third threshold (322).

Figure 2B:
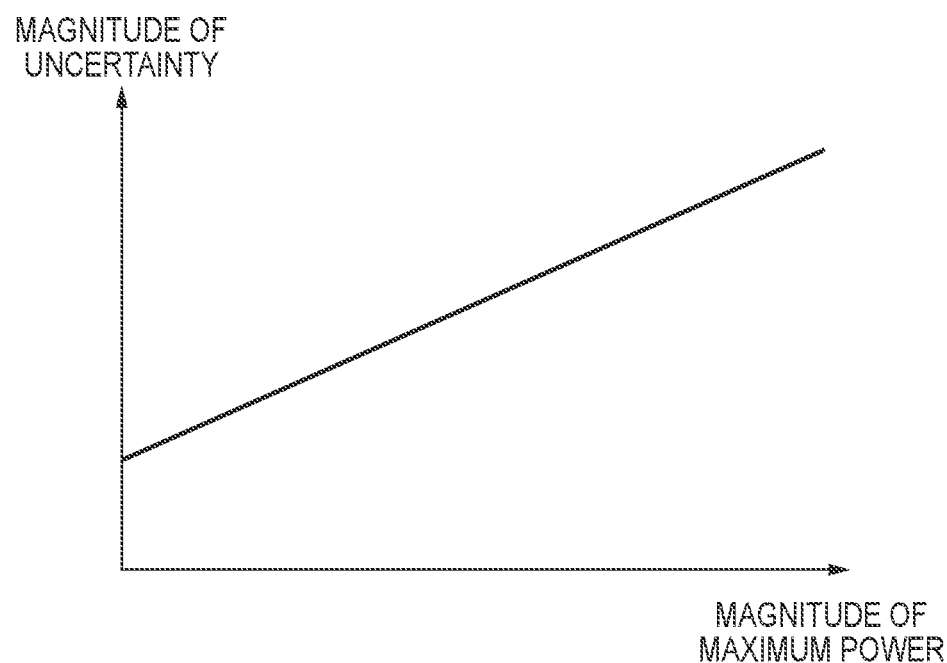
FIG. 2B is a diagram illustrating the relationship between the magnitude of maximum power and the amount of uncertainty.

Note that, as described above, the first threshold is set on the basis of the maximum power determined in step S503 and the second and third thresholds are set in accordance with the magnitude of the uncertainty determined according to the maximum power. As illustrated in FIG. 2B, the magnitude of the uncertainty increases in proportion with the maximum power. The power transmitting apparatus 100 stores the table of FIG. 2B in the memory unit 107, and the control unit 105 sets the second threshold and the third threshold in accordance with the maximum power determined in step S503 and the magnitude of the uncertainty obtained from the table of FIG. 2B. Thereafter, the power transmitting apparatus 100 starts power transmission (step S507), and the power receiving apparatus starts power reception (step S604).

The power transmitting apparatus 100 and the power receiving apparatus 120 execute Calibration processing relating to the foreign object detection function based on power loss. In the Calibration, the control unit 125 of the power receiving apparatus 120 notifies the power transmitting apparatus 100 of the received power with no load and the received power after adjustment for supplying power to the load (step S605). The control unit 105 of the power transmitting apparatus 100 determine the relationship (straight line 202 described using FIG. 2A) between the transmission power and the received power (step S508). Next, the specific process will be described using FIGS. 3 (312 to 316).

The power receiving apparatus 120 transmits, to the power transmitting apparatus 100, the received power in a state (mode 1) where the output of the voltage control unit 122 is not supplied to the load (the charging circuit 121, the battery 126, and the like) as a Received Power Packet (mode 1) (hereinafter, referred to as RPP(1)) (312). The received power value at this time is defined as Pr1. The power transmitting apparatus 100 measures the transmission power inside the power transmitting apparatus 100 when the RPP (1) is received. The transmission power at this time is defined as Pt1. After the ACK is transmitted to the power receiving apparatus 120 (313), the power transmitting apparatus 100 stores the point 200 (FIG. 2A), where the transmission power is Pt1 and the received power is Pr1, in the memory unit 107 of the power transmitting apparatus 100.

When the ACK is received, the power receiving apparatus 120 supplies the output of the voltage control unit 122 to the load (charging circuit 121, battery 126, and the like). Here, the power receiving apparatus 120 transmits a Control Error Packet requesting an increase in the transmission power to the power transmitting apparatus 100 to supply power to the load (314). In the present embodiment, in a case where the Control Error Packet indicates an increase in the transmission power, CE(+) is expressed, in a case where the Control Error Packet indicates maintaining the transmission power, CE(0) is expressed, and in a case where the Control Error Packet indicates a decrease in the transmission power, CE(−) is expressed.

After the CE for supplying power to the load is transmitted to the power transmitting apparatus 100, the power receiving apparatus 120 transmits the received power to the power transmitting apparatus 100 (315). Specifically, the power receiving apparatus 120 transmits, to the power transmitting apparatus 100, the received power in a mode 2 indicating a state where the output of the voltage control unit 122 is supplied to the load (charging circuit 121, battery 126, and the like) and that Calibration processing is in progress as a Received Power Packet (mode 2) (hereinafter, referred to as RPP(2)). The received power value at this time is defined as Pr2.

The power transmitting apparatus 100 measures the transmission power inside the power transmitting apparatus 100 when the RPP(2) is received. The transmission power at this time is defined as Pt2. After the ACK is transmitted to the power receiving apparatus 120 (316), the power transmitting apparatus 100 stores the point 201, where the transmission power is Pt2 and the received power is Pr2, in the memory unit 107 inside the power transmitting apparatus 100. Then, the power transmitting apparatus 100 calculates a line (straight line 202) joining the point 200 and the point 201. When the ACK in response to the RPP(2) is received (316), the power receiving apparatus 120 ends the Calibration processing.

When the Calibration processing ends, the control unit 125 of the power receiving apparatus 120 performs power adjustment according to the load and notifies the power transmitting apparatus 100 of the received power (step S606). The control unit 105 of the power transmitting apparatus 100 uses the received power value P received from the power receiving apparatus 120 to calculate a power loss L (step S509).

This will be described in detail using FIG. 3. After Calibration ends, the power receiving apparatus 120 periodically transmits a CEP, which is a packet for adjusting the power in accordance with fluctuations in the power consumption of the load (317). Also, the power receiving apparatus 120 periodically transmits an RPP to the power transmitting apparatus 100 (318). The RPP transmitted here is an RPP(0) indicating the received power value P in a mode 0 indicating that the power receiving apparatus 120 is supplying the output of the voltage control unit 122 to the load (charging circuit 121, battery 126, and the like) and the Calibration processing is not in progress.

Next, the determination unit 106 of the power transmitting apparatus 100 uses the received power value P received via the RPP(0) to perform the foreign object detection based on the power loss L using the method described using FIGS. 2A and 4A. The process is different depending on whether the FOP bit is 1 or not. In a case where the FOP bit is 1 (YES in step S510), the second and third threshold are set, and the control unit 105 notifies the power receiving apparatus 120 of the foreign object detection result obtained by comparing the received power value P with the second and third threshold (step S511).

For example, the power loss L is between the second threshold and the third threshold (between the straight line 400 and the straight line 402 or between the straight line 405 and the straight line 407) (second threshold>L≥third threshold). In this case, the determination unit 106 determines that there is a possibility of a foreign object existing and transmits a packet indicating this to the power receiving apparatus 120 (319). For example, an Attention packet is used to indicate that there is a possibility of a foreign object existing. In the present embodiment, this packet is defined as an Attention (foreign object existence possibility) packet (ATN (FOP)). Note that in a case where the power loss L is equal to or greater than the second threshold (L≥second threshold), the determination unit 106 determines that a foreign object exists, and the power transmitting apparatus 100 transmits, to the power receiving apparatus 120, a NAK packet indicating that a foreign object exists has been determined. Also, in a case where the power loss is less than the third threshold (L<third threshold), the determination unit 106 determines that a foreign object does not exist and transmits, to the power receiving apparatus 120, an ACK packet indicating that a foreign object does not exist has been determined.

Note that in a case where it cannot be confirmed that the power receiving apparatus 120 has the capability to receive a determination result of there is a possibility of a foreign object existing, determination of the foreign object detection using the second threshold and the third threshold is not performed. In other words, in a case where the FOP bit obtained in step S502 is not a 1 (NO in step S510), the determination unit 106 of the power transmitting apparatus 100 detects a foreign object by comparing the first threshold and the power loss L (step S512). In a case where the power loss L is equal to or greater than the first threshold, the determination unit 106 determines that a foreign object exists and notifies the power receiving apparatus 120 with a NAK packet. On the other hand, in a case where the power loss L is less than the first threshold, a foreign object does not exist is determined and the power receiving apparatus 120 is notified with an ACK packet.

The power receiving apparatus 120 branches in processing depending on whether the response to the notification of the received power value P is an ACK, a NAK, or an ATN (FOP) (step S607). When an ATN(FOP) packet is received, the power receiving apparatus 120 limits the received power (step S608, 323). Examples of a method of limiting the received power include: the power receiving apparatus 120 transmitting an End Power Transfer packet requesting for the power transmitting apparatus 100 to stop power transmission; negotiating with the power transmitting apparatus 100 to reduce the Guaranteed Power; simply reducing the received power; and the like.

In a case where the power receiving apparatus 120 receives an ACK packet and not an ATN(FOP) packet, power reception is continued until charging is complete (NO in step S609), and the subsequent RPP(0) packet or CEP(0) packet is transmitted. Also, in a case where a NAK packet is received (step S607) or a case where charging is complete (YES in step S609), the power receiving apparatus 120 transmits, to the power transmitting apparatus 100, an End Power Transfer packet requesting for the power transmitting apparatus 100 to stop power transmission (step S610).

As described above, because the power transmitting apparatus 100 is configured to transmit, to the power receiving apparatus 120, a packet indicating that there is a possibility of a foreign object existing, the power receiving apparatus 120 can limit the received power and prevent heat build-up in the foreign object due to the transmission power and the like.

As described above, according to the embodiment described above, the foreign object detection method based on power loss solves the problem of false detection where a foreign object is determined to exist when a foreign object does not exist or where a foreign object is determined to not exist when a foreign object does exist.

OTHER EMBODIMENTS

In the embodiment described above, regarding the uncertainty in FIG. 4A, Δa (arrow 403)=Δb (arrow 404) and Δc (arrow 408)=Δd (arrow 409). However, Δa≠Δb and Δc≠Δd may hold true. For example, by making Δa (arrow 403) and Δc (arrow 408) greater than Δb (arrow 404) and Δd (arrow 409), respectively, a power transmitting apparatus that limits (stops or reduces power transmission) power transmission in a case where a foreign object is determined to exist has the following effects. For example, in a case where the power transmitting apparatus 100 and the power receiving apparatus 120 both have high heat resistance, the second threshold (straight line 400, straight line 405), which is a threshold for power loss to determine that a foreign object exists, can be increased in value. This example has the effect of, even in a case where a foreign object builds up heat due to the transmission power, a larger amount of power is allowed to be transmitted and received compared to an example in which the heat resistance is low.

Also, reversely, by making Δa (arrow 403) and Δc (arrow 408) less than Δb (arrow 404) and Δd (arrow 409), respectively, a power transmitting apparatus that limits (stops or reduces power transmission) power transmission in a case where a foreign object is determined to exist has the following effects. For example, in a case where the power transmitting apparatus 100 or the power receiving apparatus 120 is sensitive to heat build-up in the foreign object, the second threshold (straight line 400, straight line 405), which is a threshold for power loss to determine that a foreign object exists, can be decreased in value. This results in power transmission and reception being stopped at a smaller amount of heat build-up when there is heat build-up in the foreign object due to the transmission power compared to an example in which the heat resistance is high.

Also, in the embodiment described above, both the second threshold and the third threshold are set. However, in another embodiment, either the second threshold or the third threshold may be set. Also, in the embodiment described above, the margin, i.e., distance, between the second threshold and the first threshold and between the third threshold and the second threshold are determined on the basis of the maximum power (Maximum Power) of the power receiving apparatus 120. However, no such limitation is intended. For example, the margin may be set on the basis of the magnitude of the Guaranteed Power and the effect is similar to that of the embodiment described above.

Also, the margin described above may be set on the basis of the received power stored in an RPP(0) successively transmitted by the power receiving apparatus 120. The maximum power and the Guaranteed Power are fixed while the power receiving apparatus 120 charges the battery 126. However, the received power stored in the Received Power Packet (mode 0) changes each time. By the power transmitting apparatus 100 setting the first to third thresholds described above on the basis of the current received power stored in the Received Power Packet (mode 0), an effect can be achieved of allowing the second threshold and the third threshold to be set in a flexible manner according to the power being transmitted or received at that time.

Also, the wireless power transmission system which the power transmitting apparatus and the power receiving apparatus are compliant with is not limited to that defined in the WPC standard, and other systems may be used, such as other electromagnetic induction systems, magnetic field resonance systems, electric field resonance systems, microwave systems, lasers, and the like.

Note that the processing by the power transmitting apparatus 100 and the power receiving apparatus may be implemented by a computer executing a program. However, one or more items of the processing may be implemented via hardware. In the case of implementing processing by hardware, for example, using a predetermined compiler, the processing can be implemented by automatically generating a dedicated circuit on an FPGA from a program for implementing the steps. FPGA stands for a field programmable gate array. In addition, similarly to an FPGA, a gate array circuit may be formed and implemented as hardware.

According to the present disclosure, the occurrence of false detection when detecting foreign objects in the power-transmittal range can be reduced.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

The invention claimed is:

1. A power transmitting apparatus that wirelessly transmits power to a power receiving apparatus, comprising:
   an obtaining unit configured to obtain a power loss on the basis of transmission power transmitted by the power transmitting apparatus and received power received by the power receiving apparatus;
   a setting unit configured to, on the basis of transmission power set with the power receiving apparatus, set a first threshold for determining whether or not a foreign object exist, setting a second threshold lower than the first threshold, and set the first threshold and the second threshold so that a difference, between the first threshold and the second threshold, in a case where transmission power is set to a second power greater than a first power is greater than a difference, between the first threshold and the second threshold, in a case where transmission power is set to the first power; and
   a determining unit configured to determine that a foreign object exists in a case where the power loss is greater than the first threshold, that a foreign object does not exist in a case where the power loss is less than the second threshold, and that there is a possibility of a foreign object existing in a case where the power loss is between the first threshold and the second threshold.

2. The power transmitting apparatus according to claim 1, wherein
   in a case where transmission power set with the power receiving apparatus is the second power, the setting unit sets, as the first threshold, a value greater than the first threshold in a case where transmission power is set to the first power.

3. The power transmitting apparatus according to claim 1, wherein
   the setting unit sets a third threshold for determining whether or not a foreign object exists on the basis of transmission power set with the power receiving apparatus and sets the first threshold higher than the third threshold and the second threshold lower than the third threshold.

4. The power transmitting apparatus according to claim 3, wherein
   a difference between the first threshold and the third threshold and a difference between the third threshold and the second threshold are an identical value.

5. The power transmitting apparatus according to claim 3, further comprising a confirming unit configured to confirm whether or not the power receiving apparatus has a capability to receive a determination result of there is a possibility of a foreign object existing, wherein the determining unit determines whether or not a foreign object exists using the third threshold in a case where the power receiving apparatus cannot be confirmed to have the capability.

6. The power transmitting apparatus according to claim 1, wherein
the transmission power is a maximum power (Maximum Power) estimated to be output to a load by the power receiving apparatus.

7. The power transmitting apparatus according to claim 1, wherein
the transmission power is a power (Guaranteed Power) the power receiving apparatus is definitely able to receive.

8. The power transmitting apparatus according to claim 1, wherein
the transmission power is a current power (Received Power) received by the power receiving apparatus.

9. The power transmitting apparatus according to claim 8, further comprising
a notifying unit configured to notify the power receiving apparatus of a result of the determining unit as a response when data based on power received by the power receiving apparatus is received from the power receiving apparatus.

10. The power transmitting apparatus according to claim 9, wherein
the notifying unit notifies the power receiving apparatus with an ACK packet in a case where a foreign object is determined to not exist, with a NAK packet in a case where a foreign object is determined to exist, and with a packet that is not an ACK packet or a NAK packet in a case where there is a possibility of a foreign object existing is determined.

11. The power transmitting apparatus according to claim 10, wherein
the notifying unit transmits an Attention packet representing that there is a possibility of a foreign object existing in a case where there is a possibility of a foreign object existing is determined.

12. A power receiving apparatus that wirelessly receives power from a power transmitting apparatus, comprising:
a receiving unit configured to receive, from the power transmitting apparatus, a notification representing at least one of three determination results including that a foreign object exists, that a foreign object does not exist, and that there is a possibility of a foreign object existing; and
a controlling unit configured to control to request the power transmitting apparatus to stop power transmission in a case where a determination result based on a notification received by the receiving unit represents that a foreign object exists, to continue receiving power from the power transmitting apparatus in a case where the determination result represents that a foreign object does not exist, and to limit power transmission by the power transmitting apparatus in a case where the determination result represents that there is a possibility of a foreign object existing.

13. The power receiving apparatus according to claim 12, further comprising a transmitting unit configured to transmit, to the power transmitting apparatus, information representing a power received from the power transmitting apparatus, wherein
the receiving unit receives a notification representing the determination result as a response to the information being transmitted.

14. The power receiving apparatus according to claim 13, wherein
in a case where the response is a NAK, this represents that a foreign object exists, in a case where the response is an ACK, this represents that a foreign object does not exist, and in a case where the response is neither a NAK nor an ACK, this represents that there is a possibility of a foreign object existing.

15. The power receiving apparatus according to claim 14, wherein
the response representing that there is a possibility of a foreign object existing is an Attention packet representing that there is a possibility of a foreign object existing.

16. A control method of a power transmitting apparatus that wirelessly transmits power to a power receiving apparatus, comprising:
obtaining a power loss on the basis of transmission power transmitted by the power transmitting apparatus and received power received by the power receiving apparatus;
on the basis of transmission power set with the power receiving apparatus, setting a first threshold for determining whether or not a foreign object exist, setting a second threshold lower than the first threshold, and setting the first threshold and the second threshold so that a difference, between the first threshold and the second threshold, in a case where transmission power is set to a second power greater than a first power is greater than a difference, between the first threshold and the second threshold, in a case where transmission power is set to the first power; and
determining that a foreign object exists in a case where the power loss is greater than the first threshold, that a foreign object does not exist in a case where the power loss is less than the second threshold, and that there is a possibility of a foreign object existing in a case where the power loss is between the first threshold and the second threshold.

17. A control method of a power receiving apparatus that wirelessly receives power from a power transmitting apparatus, comprising:
receiving, from the power transmitting apparatus, a notification representing at least one of three determination results including that a foreign object exists, that a foreign object does not exist, and that there is a possibility of a foreign object existing; and
controlling to request the power transmitting apparatus to stop power transmission in a case where a determination result based on a notification received in the receiving represents that a foreign object exists, to continue receiving power from the power transmitting apparatus in a case where the determination result represents that a foreign object does not exist, and to limit power transmission by the power transmitting apparatus in a case where the determination result represents that there is a possibility of a foreign object existing.

18. A non-transitory computer readable storage medium storing a program for causing a computer to execute a control method of a power transmitting apparatus that wirelessly transmits power to a power receiving apparatus, comprising:

obtaining a power loss on the basis of transmission power transmitted by the power transmitting apparatus and received power received by the power receiving apparatus;

on the basis of transmission power set with the power receiving apparatus, setting a first threshold for determining whether or not a foreign object exist, setting a second threshold lower than the first threshold, and setting the first threshold and the second threshold so that a difference, between the first threshold and the second threshold, in a case where transmission power is set to a second power greater than a first power is greater than a difference, between the first threshold and the second threshold, in a case where transmission power is set to the first power; and determining that a foreign object exists in a case where the power loss is greater than the first threshold, that a foreign object does not exist in a case where the power loss is less than the second threshold, and that there is a possibility of a foreign object existing in a case where the power loss is between the first threshold and the second threshold.

19. A non-transitory computer readable storage medium storing a program for causing a computer to execute a control method of a power receiving apparatus that wirelessly receives power from a power transmitting apparatus, comprising:

receiving, from the power transmitting apparatus, a notification representing at least one of three determination results including a foreign object exists, a foreign object does not exist, and there is a possibility of a foreign object existing; and controlling to request the power transmitting apparatus to stop power transmission in a case where a determination result based on a notification received in the receiving represents that a foreign object exists, to continue receiving power from the power transmitting apparatus in a case where the determination result represents that a foreign object does not exist, and to limit power transmission by the power transmitting apparatus in a case where the determination result represents that there is a possibility of a foreign object existing.

* * * * *